United States Patent [19]

Hurley

[11] 4,125,445
[45] Nov. 14, 1978

[54] ELECTROREDUCTION OF NITRATE ESTERS

[75] Inventor: Eldon K. Hurley, Carthage, Mo.

[73] Assignee: Hercules Incorporated, Wilmington, Del.

[21] Appl. No.: 799,028

[22] Filed: May 20, 1977

[51] Int. Cl.$^2$ .................................................. C02C 5/12
[52] U.S. Cl. ........................................ 204/149; 204/74; 204/128
[58] Field of Search ................ 204/149, 151, 74, 128

[56] References Cited

U.S. PATENT DOCUMENTS

| 700,670 | 5/1902 | Buchner | 204/74 |
|---|---|---|---|
| 700,672 | 5/1902 | Buchner | 204/74 |
| 736,204 | 8/1903 | Buchner | 204/74 |
| 736,205 | 8/1903 | Buchner | 204/74 |
| 761,284 | 5/1904 | Buchner | 204/74 |
| 1,926,837 | 9/1933 | Cupery | 204/74 |
| 3,103,473 | 9/1963 | Juda | 204/74 X |
| 3,455,986 | 7/1969 | Jones | 204/74 X |
| 3,475,299 | 10/1969 | Slager | 204/74 |
| 3,719,570 | 3/1973 | Lancy | 204/149 X |
| 3,730,864 | 5/1973 | Tarjanyi et al. | 204/149 |

OTHER PUBLICATIONS

Kaufman et al., "The Electrolytic Reduction of Simple Nitrate Esters," J. Am. Chem. Soc., 74, 4997, (1952).
Encyclopedia of Chem. Tech., vol. 5, Interscience, New York, (1950), pp. 495 and 662–667.

Primary Examiner—Arthur C. Prescott
Attorney, Agent, or Firm—Joshua W. Martin, III

[57] ABSTRACT

Process for the treatment of industrial process waste water including electrolytic reduction of nitro compounds and nitrate ester contaminants.

19 Claims, 1 Drawing Figure

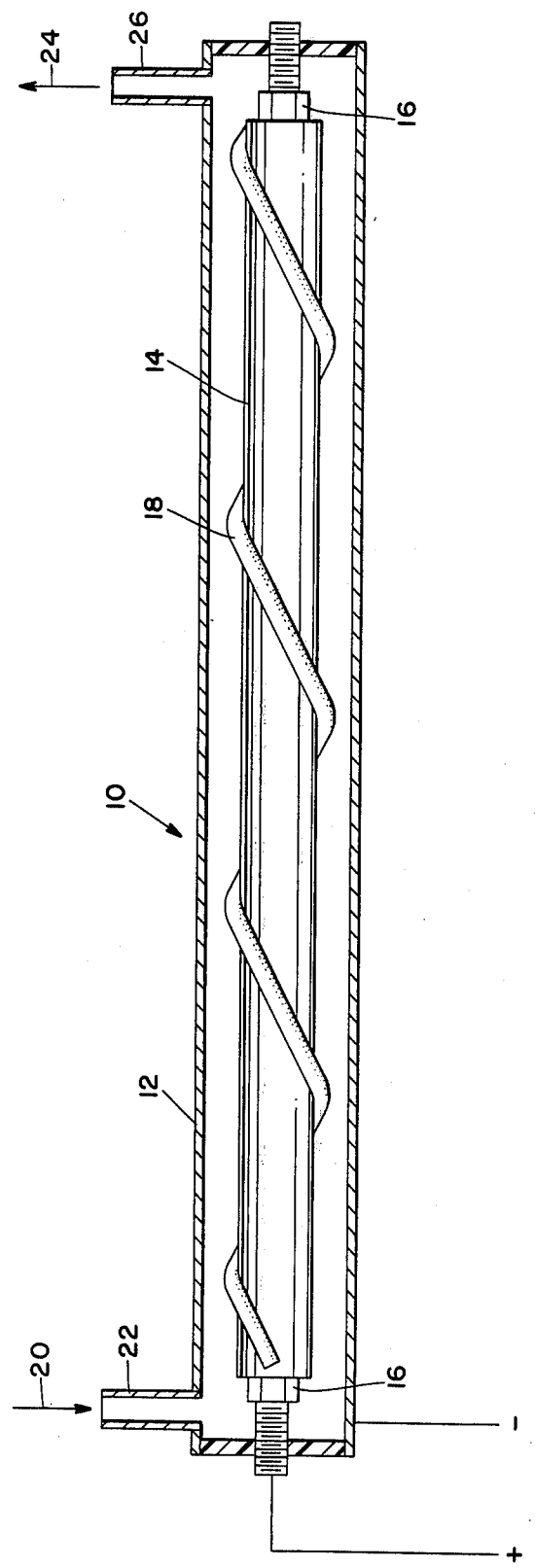

ELECTROREDUCTION OF NITRATE ESTERS

BACKGROUND OF THE INVENTION

1. Field of the Invention

This invention relates to the use of electroreduction for the elimination of nitrate esters and nitro compounds from industrial process waste water streams. This invention relates particularly to a process for the treatment of industrial process waste water containing dissolved nitrate esters and nitro compounds as contaminants.

2. Description of the Prior Art

At the present time there is no economically acceptable process for the treatment of industrial process waste waters containing dissolved nitrate esters and nitro compounds. These pollutants represent a serious threat to our water resources if not adequately removed from process waste water before it is disposed of in our streams, rivers and lakes. In the manufacture of nitroglycerin and other nitrate esters, it has been necessary to wash the crude nitration product to remove dissolved acids. It is then necessary to wash the nitroglycerin with sodium carbonate solutions to neutralize the remaining acid and stabilize the product against autocatalytic acid decomposition. It has been standard practice to discharge these wash waters containing dissolved nitroglycerin into streams to prevent the localized buildup of nitroglycerin in the ground. Other methods that have been used or proposed for the treatment of waste waters containing explosive wastes include distillation of the waste water over sodium hydroxide or other strong caustic substances, aspiration of the waste water into a flame, reduction with sulfides, and activated carbon adsorption. Both distillation and aspiration into a flame are economically unattractive due to the high energy consumed. Chemical treatments, such as reduction with sulfides, create additional pollutants, including some reaction products more toxic than nitroglycerin, which then require further treatment.

Prior art relating to the electroreduction process of this invention includes a general discussion of electroreduction found in the *Encyclopedia of Chemical Technology*, Volume 5, Interscience, New York, 1950, pages 495 and 662–667. In addition, a paper by F. Kaufman, H. J. Cook and S. M. Davis, J. Am. Chem. Soc. 74, 4997 (1952), describes the polarography of nitrate esters, specifically, ethyl and cyclohexyl nitrate. Also, it is well known in the art to use an electrolytic reduction process as a synthesis tool, where yield is of primary importance for reduction of nitro compounds as disclosed in U.S. Pat. Nos. 700,670 to Buchner, 700,672 to Buchner, 736,204 to Buchner, 736,205 to Buchner, 761,984 to Buchner, and 1,926,837 to Cupery. In the processes disclosed in the prior art, solutions are concentrated and conditions are carefully controlled to maximize yield and limit side reactions. For example, a diaphragm is often placed between electrodes to prevent undesired subsequent reactions. None of these references disclose treatment of industrial process waste water streams containing dissolved nitrate esters and nitro compounds. In addition, none of these references is concerned with elimination of nitrate esters and nitro compounds as pollutants in water.

SUMMARY OF THE INVENTION

This invention relates to a process for the treatment of industrial process waste water containing dissolved nitrate esters in aqueous solution wherein the process steps include: providing an electrolytic cell; introducing into the electrolytic cell a waste water solution containing contaminants such as nitrate esters and nitro compounds; establishing current flow in the electrolytic cell to cause cathodic reduction of the nitrogen present in said contaminants to remove the contaminants therefrom; and removing the decontaminated waste water solution from the electrolytic cell.

In the electroreduction process of this invention, no additional chemicals are added which would require additional treatment for their removal or for the removal of compounds resulting from reactions involving such additional chemicals. The electroreduction process is also efficient from an energy standpoint as the electrical energy is applied to the destruction of the dissolved nitrate esters and nitro compounds rather than, for example, to the vaporization of large volumes of water.

In accordance with this invention, it has been found that significant reductions in the nitrate ester or nitro compound content of an industrial process waste water stream can be effected by cathodic reduction of the nitrogen present in the nitrate ester or nitro compound. In addition, it has been discovered that the efficiency of the cathodic reduction process can be improved through the use of a copper cathode on which additional copper has been deposited to form a porous copper surface.

Further, the subject invention provides a method for safe, simple and economical elimination of dissolved nitrate esters and nitro compounds from industrial process waste water streams.

DESCRIPTION OF THE INVENTION

In accordance with the invention, dissolved nitrate esters in an industrial process waste water stream are electrolytically decomposed by the passage of a direct current between two electrodes immersed in the waste water. In one embodiment of the invention, a copper cathode and iron anode are used, but improved efficiency of the cathodic reduction is realized through the preferred use of a copper cathode on which additional copper has been deposited to form a porous copper surface.

In the process of this invention, the nitrogen present in a nitrate ester (R—O—N—O$_2$) may be considered at the +5 oxidation state. It appears that when the nitrate ester is dissolved in the solution undergoing electrolysis, the nitrogen is reduced at the cathode to a +4 or lower oxidation state. With the depletion of the nitrate ester concentration, the nitrogen present in the solution at various oxidation states is reduced all the way to the −3 state and ammonia is liberated. The overall course of the reaction is verified by experimental observation in that during the electrolysis of an alkaline solution of ethylene glycol dinitrate and nitroglycerin (glycerol trinitrate), sometimes hereinafter referred to as EGDN/NG, initially at a pH of 9.85, the pH drops as the nitrous and nitric acids formed, neutralize the excess alkalinity. After approximately 80% of the EGDN/NG has been destroyed, the pH begins to rise and the odor of ammonia is evident. Where nitro compounds are present in a waste water stream, the nitrogen in those nitro compounds is at the +3 oxidation state. Although other oxidation states are possible, electrolytic reduction to the +2 state liberates nitric oxide which reacts with any dissolved oxygen to form nitrogen dioxide.

The term nitro compound, as used in this specification means a compound containing the radical: $-NO_2$, namely

The term nitrate ester, as used herein means an ester containing the radical $-ONO_2$, namely

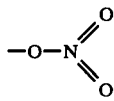

A limited choice of inert anode materials makes operation under alkaline conditions preferable. Under acid conditions, use of a platinum anode would make the economics of the process less attractive. Under alkaline conditions, iron, steel, stainless steel, and various other metals will behave as inert anodes. Copper has been found to be a very efficient cathodic material. In addition, it has been discovered that a copper-plated steel cathode will perform in essentially the same manner as a pure copper cathode. The use of copper-plated steel cathodes with steel anodes has obvious economic advantages over more exotic metals in a full scale production system.

Other factors affecting the performance of the electrolysis process of this invention, are current density (amperes per unit area of electrode surface), nitrate ester concentration, pH, cell conductivity, and agitation. It may be summarized that high efficiency is favored by low current density (less than 0.03 amps. per square centimeter), high nitrate ester concentration, pH greater than 9.0, vigorous agitation, and high cell conductivity. Cell conductivity is a function of the salt content of the solution, electrode surface area, and electrode spacing. The preferred electrode spacing (anode-cathode) is from three-tenths to one centimeter. Closer spacing results in occluded gas bubbles which cause decreased efficiency. Wider spacing results in a higher voltage drop across the solution which consumes energy in the form of resistive heating of the solution. High cell conductivity results, in turn, in a lower voltage being required to drive the desired current through the cell and hence reduces the power consumed by the system.

The electroreduction process of this invention is also applicable for treatment of industrial process waste water streams containing other nitrate esters, including pentaerythritol tetranitrate (PETN), pentaerythritol trinitrate (PETRIN), ethylene glycol mononitrate (EGM), glycerol trinitrate (NG), etc., and nitrol compounds, including trinitrotoluene (TNT), dinitrotoluene (DNT), ortho nitrotoluene (ONT), meta nitrotoluene (MNT), etc.

Industrial process waste water is herein defined as generally a solution containing materials which may be contaminants capable of environmental pollution such as nitrate esters and nitro compounds from explosives manufacture, which may be toxic and dangerous for further processing in concentrated form.

The following examples illustrate various embodiments of the present invention. The examples are not intended to limit the present invention beyond the scope of the appended claims.

DESCRIPTION OF THE DRAWING

The drawing is a front sectional view of a continuous electroreduction cell which can be used in the process of this invention.

EXAMPLE 1

An electrolysis was performed on a 1-liter sample of alkaline nitration process waste water, obtained in the production of nitroglycerin. The waste water solution was placed in a 1500 ml. beaker containing an iron anode and a copper plated copper cathode. The iron anode was a rod having a nominal diameter of 0.1228 in. diameter and a weight of 55.85 grams. The copper plated copper cathode was a rod having a nominal diameter of 0.1354" and a weight of 68.80 grams. The alkaline waste water solution contained ethylene glycol dinitrate and glycerol trinitrate (EDGN/NG) in a ratio of 83/17 respectively. The initial concentration of the nitrate esters in the 1-liter solution was 2400 p.p.m. The solution was subjected to electroreduction in the beaker for 2½ hours at a current of 2 amps. DC. The final nitrate ester concentration was found to be 30 p.p.m.

EXAMPLE 2

Several experiments were performed to determine the effect of pH on the final concentration of nitrate esters in solution using apparatus similar to that used in Example 1. Two 1-liter samples containing 3,110 p.p.m. EGDN/NG each were subjected to electrolysis for two hours at 2 amps. and 4 volts. The first sample had a starting pH of 9.85 and a final pH of 6.5. The final EGDN/NG concentration was 344 p.p.m. In the second sample, the starting pH was increased to 11.35 by the addition of 5.1 ml. 50% sodium hydroxide. The final pH was 11.1 and the final EGDN/NG content was 160 p.p.m. These results indicate that the inventive process is more efficient at a higher initial pH level. Although the process will work using a waste water solution having a pH less than 7, it is preferable to use a pH greater than 8 to protect iron, stainless steel or other electrodes from corrosive attack.

EXAMPLE 3

To determine the effect of current density on the inventive process, three 15-liter waste water samples, each containing 4200 p.p.m. EGDN/NG in the ratio of 83/17 respectively, were separately subjected to electrolysis. A batch electrolysis cell, having a nominal diameter of 12 inches and a depth of 12 inches, was constructed. The electrodes consisted of 50 8-inch square stainless steel and copper plates, placed in a row in alternating positions and spaced 150 inch apart. A 2½ inch diameter hole through the center of each of the 50 plates allowed room for an agitator, connected to a laboratory mixer, to extend through each of the plates to provide sufficient agitation to insure that there was adequate contact of the solution with the stainless steel and copper plates. The copper cathode and stainless steel anode had, respectively, a total surface area of 19,060 square centimeters.

Each of the three waste water samples was subjected to electrolytic reduction according to the conditions as shown in Table 1. Current density, which is the total current in amperes per square centimeter of cathode surface, was varied from 0.016 amps. per square centimeter to 0.004 amps. per square centimeter. This current density difference produced a drop in the concentration of EGDN/NG from 1200 p.p.m. to 410 p.p.m., with a corresponding drop in energy consumption from 263 watt hours to 150 watt hours.

Table 1

| Time Hrs. | Current Amps. | Voltage | Current Density Amps./cm$^2$ | Power Consumption Watt Hours | EGDN /NG Initial p.p.m. | Concentration Final p.p.m. |
|---|---|---|---|---|---|---|
| .25 | 300 | 3.5 | .016 | 263 | 4200 | 1200 |
| .5 | 150 | 2.5 | .008 | 188 | 4200 | 660 |
| 1 | 75 | 2 | .004 | 150 | 4200 | 410 |

EXAMPLE 4

To determine the effect of nitrate ester concentration, two samples of nitroglycerin neutralizer/storehouse waste water, each containing 4800 p.p.m. EGDN/NG in the ratio of 83/17 respectively, were diluted to 2400 p.p.m. for Test #1 and 1200 p.p.m. for Test #2. These two samples were each subjected to electrolysis in apparatus similar to that used in Example 1 for 2.5 hours at 1.6 to 2.0 amps. At the end of this time period, the sample of Test #1, initially containing 2400 p.p.m., was found to contain 60 p.p.m. EGDN/NG. The sample of Test #2, initially containing 1200 p.p.m. EGDN/NG, was found to contain 34 p.p.m. Thus, even though the initial concentration differed by a factor of 2, the power consumed was the same, indicating a higher efficiency at the higher initial concentration level.

EXAMPL 5

To examine power consumption, an electrolytic batch cell similar to that used in Example 3 was used. Fifteen liters of alkaline 83 EGDN/17 NG waste water containing 4500 p.p.m. dissolved nitrate esters in the proportions of 83% ethylene glycol dinitrate and 17% glycerol trinitrate, were subjected to electroreduction between the copper cathodes and stainless steel anodes of the cell for 3 hours at 37.5 amps., 2.5 v. DC, corresponding to 0.002 amps. per square centimeter. The final EGDN/NG concentration was 60 p.p.m. This calculates to an expenditure of 1.91 kilowatt hours per pound of EGDN/NG destroyed.

EXAMPLE 6

To demonstrate the improved effectiveness of a deposited porous copper surface on a copper cathode in the electroreduction process of this invention, two experiments were conducted using a 1500 ml. beaker as the container for the electrolytic cell. In both, one liter of alkaline waste water containing 4500 p.p.m. dissolved nitrate ester was used as the test solution. The nitrate ester composition was 83% ethylene glycol dinitrate and 17% glycerol trinitrate. A 77 sq. centimeter mild steel plate was used as the anode in both tests. Spacing between the anode and cathode was held constant at 0.5 centimeter. In the first test, a copper plate, 77 sq. centimeters, was used as the cathode. Following electroreduction for 1 hour at 7 amps., 6.1 volts DC, the nitrate ester concentration was found to be 2200 p.p.m. In the second test, copper from 1 gram of copper sulfate was deposited on the copper cathode from an ammoniacal solution at pH 10.3. The deposited copper formed a porous spongy copper surface. One liter of the previously described nitrate ester test solution was then subjected to electroreduction for 1 hour at 7 amps., 5.8 volts DC. The nitrate ester concentration was then found to be 1950 p.p.m. This result represents a significant improvement in efficiency for the porous copper surfaced cathode over the untreated copper cathode.

EXAMPLE 7

To demonstrate the effectiveness of the method of this invention with nitrate esters other than ethylene glycol trinitrate and glycerol trinitrate, a test was run using a 15 liter waste water solution from an acetone still used in the production of pentaerythritol nitrate. The initial pentaerythritol nitrate ester concentration was 240 p.p.m. This waste water solution was subjected to electrolytic reduction at 15 amps. DC for 6 hours, using apparatus similar to that used in Example 1. Subsequent infrared spectrographic analysis indicated that all of the pentaerythritol nitrate ester originally present had been destroyed. This experiment clearly demonstrates the feasibility of using this electroreduction technique to destroy other nitrate esters present in industrial process waste water streams.

EXAMPLE 8

To demonstrate the feasibility of using this electroreduction process with waste waters contaminated with nitro compounds, such as would be encountered in the manufacture of trinitrotoluene, dinitrotoluene, etc., 15 liters of water was saturated with dinitrotoluene oil. Analysis indicated an initial dinitrotoluene content of 488 p.p.m. The pH of the DNT solution was adjusted to pH 10 by the addition of sodium carbonate. After electrolytic reduction at 30 amps., 4 volts DC for 30 minutes, analysis indicated the presence of only 97 p.p.m. dinitrotoluene.

EXAMPLE 9

A diagram of a continuous flow electroreduction cell which can be used in the process of this invention is shown in the Drawing. In this embodiment, the electroreduction cell 10 had a cathode 12 made from 1⅛" O.D. copper tubing. The anode 14 was made from ½" diameter cold rolled steel, and held in place within the cathode by ½" plastic tube fittings 16. An alternate anode structure found to produce higher electroreduction efficiency, but which is more expensive, which could be used in this continuous flow cell is a ½" diameter stainless steel tube having a copper rod inserted therein. In this alternate embodiment, the surface of the copper rod should be in substantial contact with the inner surface of the stainless steel tubing. To prevent contact between the copper cathode 12 and steel anode 14 and to provide localized agitation, a 5/32" diameter flexible polyethylene rod 18 was wrapped around steel anode 14. Ten of these electroreduction cells were connected in series as to flow with electrical connections in parallel, the combined cells having a volume of approximately 3 gallons. Process waste water 20 entered cell 10 through entry tube 22 and the purified effluent 24 was removed through exit tube 26. An alkaline process waste water stream containing 3800 p.p.m. dissolved nitrate ester, 83 EGDN/17NG was fed to the ten tubular cells, each operated in parallel at 330 amps. at a voltage of 4 volts. The nitrate ester concentration in the effluent at various flow rates is shown in Table 2. These results demonstrate the feasibility of a continuous flow treatment system for destruction of dissolved nitrate esters in a process waste water stream.

Table 2

| Flow Rate Gal./Min. | Nitrate ester concentration in effluent in p.p.m. |
|---|---|
| .1 | 40 |
| .3 | 760 |
| 1.0 | 1500 |

As many apparent and widely different embodiments of this invention may be made without departing from the spirit and scope hereof, it is to be understood that the invention is not limited to the specific embodiments thereof except as defined in the appended claims.

What I claim and desire to protect by Letters Patent is:

1. A method for the treatment of waste water containing various contaminants comprising:
   providing an electrolytic cell;
   introducing into said electrolytic cell a waste water solution containing contaminants selected from the group consisting of nitrate esters and nitro compounds;
   establishing current flow in said electrolytic cell to cause cathodic reduction of the nitrogen present in said contaminants to remove said contaminants therefrom; and
   removing said waste water solution from said electrolytic cell.

2. The method of claim 1 including establishing current flow in said electrolytic cell to provide a current density of less than about 0.03 amps. per $cm^2$.

3. The method of claim 1 including vigorously agitating said waste water solution after establishing current flow in said electrolytic cell.

4. The method of claim 1 wherein said electrolytic cell has an anode and a cathode spaced apart in the range of about 0.3 centimeter to 1.0 centimeter.

5. The method of claim 1 including adjusting the pH of said waste water solution to a value greater than about 7.0 prior to introducing said solution into said electrolytic cell.

6. The method of claim 1 including adjusting the pH of said waste water solution to a value greater than about 9.0 prior to introducing said solution into said electrolytic cell.

7. The method of claim 1 wherein said electrolytic cell includes a metal cathode having deposited thereon a porous surface layer of copper.

8. A method for the treatment of waste water containing nitrate ester contaminants comprising:
   providing an electrolytic cell;
   introducing into said electrolytic cell a waste water solution containing nitrate ester contaminants;
   establishing current flow in said electrolytic cell to cause cathodic reduction of the nitrogen present in said contaminants to remove said nitrate ester contaminants therefrom; and
   removing said waste water solution from said electrolytic cell.

9. The method of claim 8 wherein the nitrate ester contaminant is ethylene glycol dinitrate and glycerol trinitrate.

10. The method of claim 8 wherein the nitrate ester contaminant is pentaerythritol tetranitrate.

11. The method of claim 8 wherein the nitrate ester contaminant is pentaerythritol trinitrate.

12. The method of claim 8 wherein the nitrate ester contaminant is ethylene glycol mononitrate.

13. The method of claim 8 wherein the nitrate ester contaminant is glycerol trinitrate.

14. A method for the treatment of waste water containing nitro compounds as contaminants comprising:
   providing an electrolytic cell;
   introducing into said electrolytic cell a waste water solution containing nitro compounds as contaminants;
   establishing current flow in said electrolytic cell to cause cathodic reduction of the nitrogen present in said contaminants to remove said contaminants therefrom; and
   removing said waste water solution from said electrolytic cell.

15. The method of claim 14 wherein the nitro compound is trinitrotoluene.

16. The method of claim 14 wherein the nitro compound is dinitrotoluene.

17. The method of claim 14 wherein the nitro compound is ortho-nitrotoluene.

18. The method of claim 14 wherein the nitro compound is meta-nitrotoluene.

19. A method for the continuous treatment of waste water containing various contaminants comprising:
   providing a continuous flow electrolytic cell; and
   continuously passing through said electrolytic cell a waste water solution containing contaminants selected from the group consisting of nitrate esters and nitro compounds, while establishing and maintaining current flow in said electrolytic cell to cause cathodic reduction of the nitrogen present in said contaminants to remove said contaminants therefrom.

* * * * *